Dec. 18, 1923.

G. C. KEAR

BALL VALVE

Filed April 13, 1921    2 Sheets-Sheet 1

1,478,125

Inventor
George G. Kear
By Frank Keizer
Attorney

Dec. 18, 1923.

G. C. KEAR 1,478,125

BALL VALVE

Filed April 13, 1921    2 Sheets-Sheet 2

Inventor
George C. Kear

By Frank Hoyes
Attorney

Patented Dec. 18, 1923.

1,478,125

UNITED STATES PATENT OFFICE.

GEORGE C. KEAR, OF ROCHESTER, NEW YORK.

BALL VALVE.

Application filed April 13, 1921. Serial No. 461,043.

*To all whom it may concern:*

Be it known that I, GEORGE C. KEAR, a citizen of the United States, residing at Rochester, in the county of Monroe and State of New York, have invented certain new and useful Improvements in Ball Valves, of which the following is a specification.

The object of this invention is to provide a new and improved type of rotary ball valve for steam engines which is so constructed that it can be interchanged or substituted for the slide valve in the steam chest of a steam engine or in the engineer's brake valves.

This and other objects of this invention will be fully illustrated in the drawings, described in the specification and pointed out in the claims at the end thereof.

In the accompanying drawings.

In the several figures of the drawings, like reference numerals indicate like parts.

Figure 1:
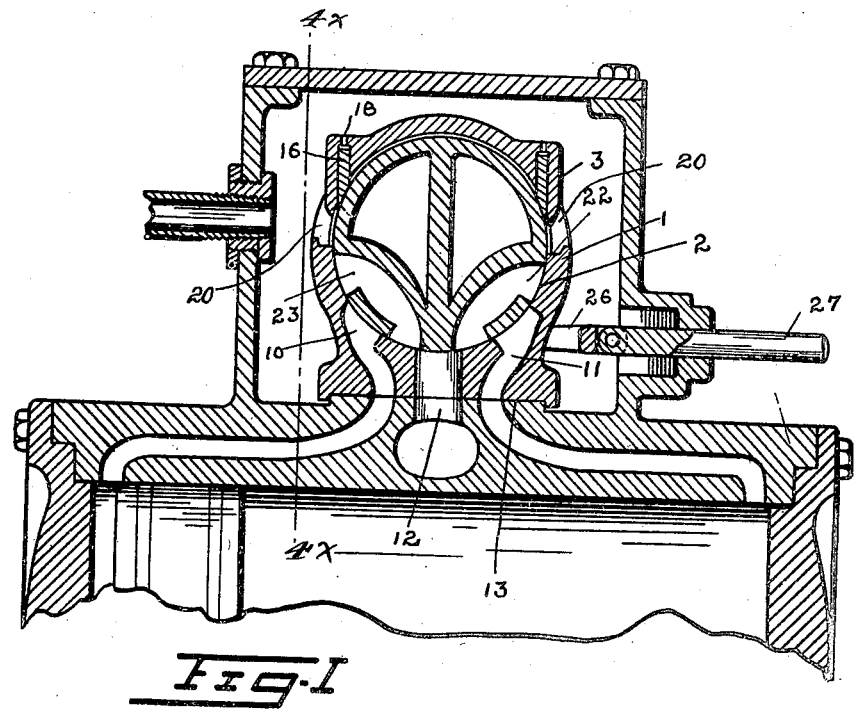
Fig. 1 is a vertical sectional view of the steam chest and a portion of the cylinder of a steam engine with the ball valve mounted in the steam chest.
Figures 2, 3:
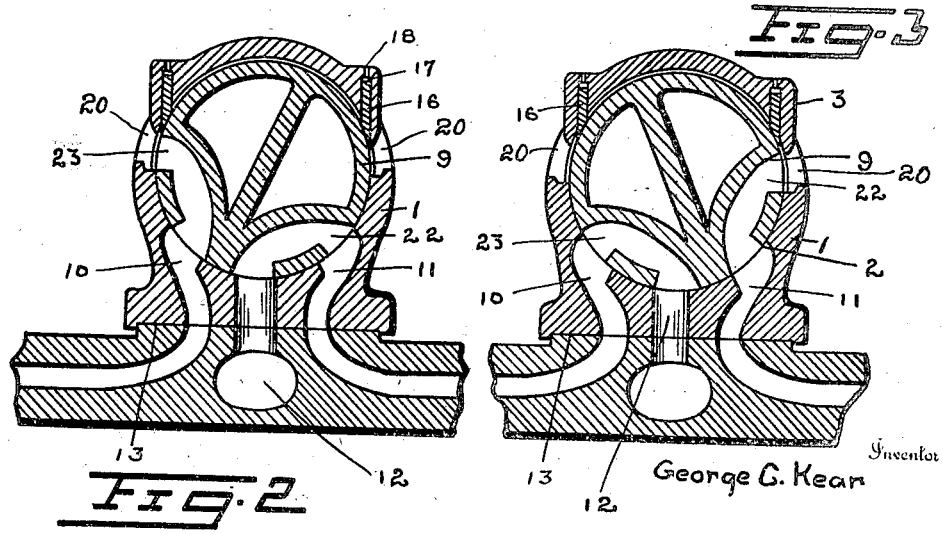
Figs. 2 and 3 are sectional views of the ball valve and associated parts thereof, showing the ball valve in different positions.
Figure 4:
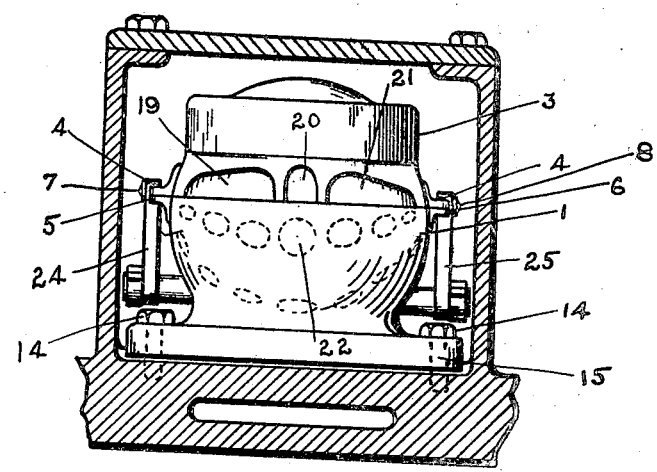
Fig. 4 is a vertical sectional view of the steam chest of the engine with the ball valve mounted therein, the valve being shown in elevation and the section of the steam chest being taken on the line $4^x$—$4^x$ of Fig. 1.
Figure 5:
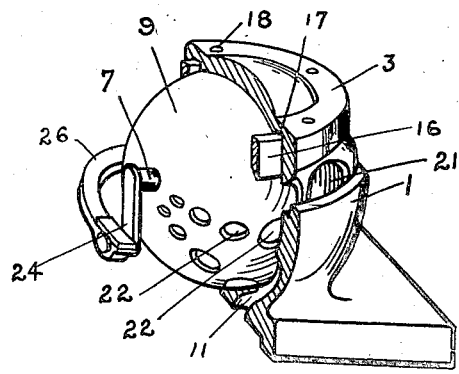
Fig. 5 is a detail perspective view of the ball valve, the casing of the valve being partly broken away.

The slide valves of locomotives and stationary engines which regulate the intake and exhaust of the steam in the cylinders, are depended upon to give the engine the highest efficiency. Any wear of either or both the stationary seat and the sliding seat of the valve impairs this efficiency and must be corrected if the engine is to do its work properly. In a valve having worn seats, the seats must be scraped and lapped in order to prevent a leakage of steam past the valve into the cylinder. This operation necessitates considerable time, during which time the engine must remain idle. Considerable loss in time is thus incurred which, in the case of a locomotive, is obviously an expensive loss.

In the valve forming the subject matter of this invention, this loss is reduced to a minimum because the valve is made interchangeable with either the ordinary types of slide valves or a valve of the same type. It comprises the casing 1, in which a ball seat 2 is formed. The casing is divided in the middle on a horizontal line so that the upper half thereof forms a cap 3 that is suitably clamped to the lower half by means of the bolts 4, 4, at two diametrically opposite sides thereof. At the points at which the cap is fastened to the lower half of the casing, the bearings 5 and 6 are provided, in which the shafts 7 and 8 are mounted to rock. These shafts are formed at points diametrically opposite each other on the ball 9, which they support in the casing.

The ball 9 is seated in the ball seat 2 of the casing 1, into which it is fitted to make good sliding contact between the two surfaces. In the bottom of the casing are provided the intake ports 10 and 11, with the exhaust port 12 between them. The exit of all of these ports on the outside of the casing at the bottom thereof register with the corresponding intake and exhaust ports provided on the flat surface of the original seat of the slide valve.

For this purpose, the bottom of the casing 1 is channeled to engage and straddle the seat 13 of the slide valve which is being replaced by the ball valve. Suitable bolts 14 are provided that pass thru the flange 15 formed at the bottom of the casing into the seat of the original slide valve and in this way the ball valve is securely fastened in place in the steam chest to take the place of the slide valve that has been replaced thereby.

The inner wall of the cap of the casing is not tightly clamped to the ball but has a ring 16 mounted therein which is adapted to rest freely on the periphery of the ball. The channel 17 in which this ring is mounted has a series of holes 18 leading into it from the top, thru which steam can enter to force the ring down into frictional contact with the periphery of the ball. This prevents any foreign matter from passing up under the cap 3 between it and the ball 9.

The casing is provided with two series of intake ducts which are formed in the cap 3 of the casing and consist of three openings 19, 20 and 21, provided at each side of the cap. These intake ducts are adapted to register with the inlets of the ducts 22 and 23, provided in the ball 9. The ducts 22 and 23 are tubular and are distributed over the periphery at each side of the ball. The inside diameter of these ducts varies with the duct in the middle, being the largest in diameter and the ducts at each end being the smallest in diameter. These ducts are designed to alternately connect the intake ducts 19, 20 and 21 at each side of the ball casing 1 with the intake port 10 and exhaust port 12 on the one side and the intake port 11 and exhaust port 12 on the other side.

The intake ports 10 and 11 and the exhaust port 12 formed in the bottom of the casing 1 are continuations of the intake ports provided in the original valve seat of the slide valve which is replaced by the ball valve, and the ducts in the ball of the ball valve control the intake and the exhaust of the steam in both ends of the cylinder by rocking in the casing 1 and alternately covering and uncovering the intake and exhaust ports.

The ball valve is operated thru the cranks 24 and 25, which are keyed or otherwise suitably connected to the ends of the shafts 7 and 8, on which the ball is mounted to rock in the casing 1. These cranks have the ends of the yoke 26 connected thereto. The yoke, in turn, is connected to the end of the eccentric rod 27. On the reciprocation of the eccentric rod, the yoke and, in turn, the cranks, are rocked and give the ball the proper rocking motion necessary to make the ducts in the ball connect the intake and exhaust ports in the valve casing. In this way, steam is admitted from the steam chest into each end of the cylinder and then exhausted therefrom.

The ball valve is evenly balanced at all points of contact in the valve seats. The frictional contact of the shafts that carry the ball of the valve is considerably smaller than the contact that the surface of the ball makes with the ball seat in the valve casing. This prevents undue wear of the shafts and their bearings and gives the ball and its seat a chance to wear evenly over their whole surfaces.

Only a slight pressure is used to force the ball onto its seat and this pressure is exerted by the steam that enters the openings or holes 18 in the cap 3 of the valve casing. This pressure is evenly distributed over the periphery of the ball by the ring 16, which is exposed to the pressure of the steam entering into the openings 18 in the valve casing.

To replace a slide valve of a steam engine, the steam chest is opened and the slide taken out therefrom. The ball valve casing is then mounted onto the seat of the slide valve as above described and the yoke for rocking the ball of the ball valve connected to the end of the eccentric rod from which the old slide valve has previously been disconnected.

The steam chest cover can then be replaced and the engine is ready to operate with a new valve in which the valve seats are tight. This change in the valves takes but a very short time and does not hold up the use of the engine probably more than thirty minutes.

I claim:

1. In a ball valve, the combination of a ball casing, comprising an upper and a lower section, said lower section having a seat formed therein, the upper section of said casing forming a cap, a ball mounted to rock in said seat formed in the lower section thereof, an annular ring mounted in said upper section and freely resting on the perimeter of said ball, said cap having holes in the top thereof to admit steam into it to force said annular ring against the perimeter of said ball and form a packing ring between the upper half of the casing and said ball, said casing having intake ports on either side thereof, a valve seat at the bottom of said casing adapted to rest on the valve seat of a slide valve, and means to fasten the valve casing to the seat of the slide valve.

2. In a ball valve, the combination of a ball casing comprising an upper and a lower section, a ball mounted to rock in the lower section of said casing and held therein by the upper section, a channel in the upper section opening downward on the ball, said channel having holes in the top thereof, a ring mounted in said channel, said ball being adapted to hold said ring in place in said channel, the steam in the steam chest of the valve being adapted to force said ring in engagement with the perimeter of said ball and in turn force said ball into its seat formed by the lower section of said casing.

In testimony whereof I affix my signature.

GEORGE C. KEAR.